United States Patent
Vejlgaard et al.

(10) Patent No.: US 12,108,439 B2
(45) Date of Patent: Oct. 1, 2024

(54) RADAR OPERATION OF WIRELESS DEVICE IN WIRELESS COMMUNICATION SYSTEM

(71) Applicant: Nokia Technologies Oy, Espoo (FI)

(72) Inventors: Benny Vejlgaard, Gistrup (DK); Kari Pajukoski, Oulu (FI); Marco Maso, Issy les Moulineaux (FR); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 387 days.

(21) Appl. No.: 17/634,810

(22) PCT Filed: Aug. 15, 2019

(86) PCT No.: PCT/EP2019/071932
§ 371 (c)(1),
(2) Date: Feb. 11, 2022

(87) PCT Pub. No.: WO2021/028056
PCT Pub. Date: Feb. 18, 2021

(65) Prior Publication Data
US 2022/0330324 A1    Oct. 13, 2022

(51) Int. Cl.
*H04W 74/00* (2009.01)
*G01S 7/02* (2006.01)
*H04W 74/0833* (2024.01)

(52) U.S. Cl.
CPC .......... *H04W 74/008* (2013.01); *G01S 7/021* (2013.01); *G01S 7/023* (2013.01); *H04W 74/0833* (2013.01)

(58) Field of Classification Search
None
See application file for complete search history.

(56) References Cited

U.S. PATENT DOCUMENTS

| 10,305,611 B1 | 5/2019 | Rimini et al. |
| 2007/0206531 A1* | 9/2007 | Pajukoski ........... H04W 74/002 370/329 |

(Continued)

FOREIGN PATENT DOCUMENTS

| WO | 2013/081525 A1 | 6/2013 |
| WO | 2017/188730 A1 | 11/2017 |

(Continued)

OTHER PUBLICATIONS

"Revised SID on Study on NR beyond 52.6GHz", 3GPP TSG RAN Meeting #82, RP-182861, Agenda: 9.3.17, Intel Corporation, Dec. 10-13, 2018, 4 pages.

(Continued)

*Primary Examiner* — Faruk Hamza
*Assistant Examiner* — Cassandra L Decker
(74) *Attorney, Agent, or Firm* — Robert P. Michal, Esq.; Carter, DeLuca & Farrell LLP

(57) ABSTRACT

There is provided radar operation in a wireless communication system. A method comprises transmitting a random access message for one or more communication resources for a radar operation of a wireless device of a wireless communication system, receiving a grant for at least one communication resource for the radar operation of the wireless device, selecting a radar sequence for generating a radar signal, and transmitting the radar signal using the selected radar sequence in the communication resource.

16 Claims, 10 Drawing Sheets

(56) References Cited

U.S. PATENT DOCUMENTS

| | | | |
|---|---|---|---|
| 2010/0142456 A1* | 6/2010 | Lee | H04W 52/0216 370/328 |
| 2010/0173586 A1 | 7/2010 | McHenry et al. | |
| 2015/0063146 A1 | 3/2015 | Sadek et al. | |
| 2016/0080101 A1 | 3/2016 | Naeini et al. | |
| 2017/0006493 A1 | 1/2017 | Chincholi et al. | |
| 2017/0219689 A1 | 8/2017 | Hung et al. | |
| 2017/0343648 A1 | 11/2017 | Trotta et al. | |
| 2018/0287651 A1 | 10/2018 | Fernando et al. | |
| 2018/0348353 A1 | 12/2018 | Lien et al. | |
| 2020/0007260 A1* | 1/2020 | Axnäs | H04J 13/0029 |
| 2020/0107249 A1* | 4/2020 | Stauffer | H04W 48/14 |
| 2022/0066018 A1* | 3/2022 | Han | G01S 7/0232 |

FOREIGN PATENT DOCUMENTS

| | | | |
|---|---|---|---|
| WO | 2018/097817 A1 | 5/2018 | |
| WO | 2018/160110 A1 | 9/2018 | |
| WO | 2018/182723 A1 | 10/2018 | |
| WO | 2018/210427 A1 | 11/2018 | |

OTHER PUBLICATIONS

"3rd Generation Partnership Project; Technical Specification Group Radio Access Network; Study on New Radio access technology; 60 GHz unlicensed spectrum (Release 14)", 3GPP TR 38.805, V14.0.0, Mar. 2017, pp. 1-17.

"3rd Generation Partnership Project; Technical Specification Group Radio Access Network; Study on requirements for NR beyond 52.6 GHz (Release 16)", 3GPP TR 38.807, V0.2.0, Jun. 2019, 67 pages.

Khawar et al., "Spectrum sharing between S-band radar and LTE cellular system: A spatial approach", IEEE International Symposium on Dynamic Spectrum Access Networks (DYSPAN), Apr. 1-4, 2014, pp. 7-14.

Shajaiah et al., "Spectrum Sharing Approach between Radar and Communication Systems and Its Impact on Radar's Detectable Target Parameters", IEEE 81st Vehicular Technology Conference (VTC Spring), May 11-14, 2015, 6 pages.

Naparstek et al., "Hybrid Opportunistic Radar Over Long Term Evolution Networks", IEEE Radar Conference (RadarCon), May 10-15, 2015, pp. 1551-1554.

Guerci et al., "RAST: Radar as a subscriber technology for wireless spectrum cohabitation", IEEE Radar Conference, May 19-23, 2014, pp. 1130-1134.

Paul et al., "Survey of RF Communications and Sensing Convergence Research", IEEE Access, vol. 5, Dec. 13, 2016, pp. 252-270.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Radio Access Network; NR; Physical layer procedures for data (Release 15)", 3GPP TS 38.214, V15.5.0, Mar. 2019, pp. 1-103.

"IEEE 802.11ad", Wikipedia, Retrieved on Jan. 12, 2022, Webpage available at : https://en.wikipedia.org/wiki/IEEE_802.11ad.

"IEEE 802.11ay", Wikipedia, Retrieved on Jan. 12, 2022, Webpage available at : https://en.wikipedia.org/wiki/IEEE_802.11ay.

Wang et al., "Radar-to-radar Interference Suppression for Distributed Radar Sensor Networks", Remote Sensing, vol. 6, No. 1, 2014, pp. 740-755.

Aydogdu et al., "Radar Communication for Combating Mutual Interference of FMCW Radars", arXiv, Oct. 5, 2018, 6 pages.

Khawar et al., "Coexistence Analysis Between Radar and Cellular System in Los Channel", arXiv, Apr. 17, 2017, 5 pages.

Thoma et al., "Cooperative Passive Coherent Location: a Promising 5g Service to Support Road Safety", arXiv, Jul. 10, 2019, pp. 1-7.

"IEEE 802.11", Wikipedia, Retrieved on Feb. 10, 2022, Webpage available at : https://en.wikipedia.org/wiki/IEEE_802.11.

"3rd Generation Partnership Project; Technical Specification Group Radio Access Network; NR; Physical layer procedures for data (Release 15)", 3GPP TS 38.214, V15.6.0, Jun. 2019, pp. 1-105.

International Search Report and Written Opinion received for corresponding Patent Cooperation Treaty Application No. PCT/EP2019/071936, dated Apr. 3, 2020, 10 pages.

International Search Report and Written Opinion received for corresponding Patent Cooperation Treaty Application No. PCT/EP2019/071932, dated Apr. 14, 2020, 14 pages.

Petrov et al., "On Unified Vehicular Communications and Radar Sensing in Millimeter-Wave and Low Terahertz Bands", IEEE Wireless Communications, vol. 26, No. 3, Jun. 2019, pp. 146-153.

Schreiber et al., "5G New Radio Physical Random Access Preamble Design", IEEE 5G World Forum (5GWF), Jul. 9-11, 2018, pp. 215-220.

Office Action received for corresponding European Patent Application No. 19755600.4, dated Dec. 20, 2023, 10 pages.

* cited by examiner

RADAR OPERATION OF WIRELESS DEVICE IN WIRELESS COMMUNICATION SYSTEM

RELATED APPLICATION

This application was originally filed as PCT Application No. PCT/EP2019/071932 on Aug. 15, 2019, which is hereby incorporated in its entirety.

TECHNICAL FIELD

The present invention relates to radar operation of a wireless device in a wireless communication system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communications systems provide connections to User Equipment (UE) in their coverage areas. UE having radar capability are capable of radar operation. Radar operation comprises transmission and reception of sounding signals. If radar capabilities are introduced to the UE, radar operations performed by UE close to each other can cause interference to each other as well as to communications in the wireless communication system particularly, when frequency band used for the radar at least partly overlaps with the frequency band of the wireless communication system.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According a first aspect, there is provided an access node comprising: a processor; and a transceiver; wherein the processor is configured to: control the transceiver to receive a random access message from a wireless device of a wireless communication system;
  determine that the received random access message is for a radar operation of the wireless device; and
  control the transceiver to transmit a grant for one or more communication resources for the radar operation of the wireless device.

According a second aspect, there is provided a wireless device comprising: a processor; and a transceiver, wherein the processor is configured to:
  control the transceiver to transmit a random access message for one or more communication resources for a radar operation of the wireless device in a wireless communication system;
  control the transceiver to receive a grant for at least one communication resource for the radar operation of the wireless device;
  select a radar sequence for generating a radar signal; and
  control the transceiver to transmit the radar signal using the selected radar sequence in the communication resource.

According to a third aspect there is provided a method comprising:
  receiving a random access message from a wireless device of a wireless communication system;
  determining that the received random access message is for a radar operation of the wireless device; and
  transmitting a grant for one or more communication resources for the radar operation of the wireless device.

According to a fourth aspect there is provided a method comprising:
  transmitting a random access message for one or more communication resources for a radar operation of a wireless device in a wireless communication system;
  receiving a grant for at least one communication resource for the radar operation of the wireless device;
  selecting a radar sequence for generating a radar signal; and
  transmitting the radar signal using the selected radar sequence in the communication resource.

According to a fifth aspect there is provided a computer program comprising computer readable program code means adapted to perform at least the following:
  receiving a random access message from a wireless device of a wireless communication system;
  determining that the received random access message is for a radar operation of the wireless device; and
  transmitting a grant for one or more communication resources for the radar operation of the wireless device.

According to a sixth aspect there is provided a computer program comprising computer readable program code means adapted to perform at least the following:
  transmitting a random access message for one or more communication resources for a radar operation of a wireless device in a wireless communication system;
  receiving a grant for at least one communication resource for the radar operation of the wireless device;
  selecting a radar sequence for generating a radar signal; and
  transmitting the radar signal using the selected radar sequence in the communication resource.

According to a seventh aspect, there is provided a computer program according to an aspect embodied on a computer readable medium.

According to an eighth aspect, there is provided a non-transitory computer readable medium comprising program instructions stored thereon for performing at least the following:
  receiving a random access message from a wireless device of a wireless communication system;
  determining that the received random access message is for a radar operation of the wireless device; and
  transmitting a grant for one or more communication resources for the radar operation of the wireless device.

According to a ninth aspect, there is provided a non-transitory computer readable medium comprising program instructions stored thereon for performing at least the following:
  transmitting a random access message for one or more communication resources for a radar operation of a wireless device in a wireless communication system;
  receiving a grant for at least one communication resource for the radar operation of the wireless device;
  selecting a radar sequence for generating a radar signal; and transmitting the radar signal using the selected radar sequence in the communication resource.

According to one or more further aspects, embodiments according to the first, second, third, fourth, fifth, sixth, seventh, eighth, ninth aspect comprise one or more features of:

the radar sequence is selected by the wireless device, when
the wireless device is out of coverage area of the wireless communication system;
the random access message has been transmitted without a dedicated random access preamble indicating a radar operation; and/or
the grant fails to include a radar sequence identifier;
the random access message comprises a dedicated random access preamble indicating the radar operation;
an uplink shared channel message is transmitted associated with the random access message;
the radar sequence is selected on the basis of a pre-configuration of a radar sequence identifier or a set of candidate radar sequence identifiers of the wireless device;
the pre-configuration is based on a Subscriber Identity Module, SIM, or a User Equipment, UE, identifier of the wireless device;
the radar sequence is selected on the basis of a radar sequence identifier included in the grant;
the radar signal is based on Zhadoff Chu-, m- or gold sequence;
the radar signal is a sounding reference signal of the wireless communication system;
omitting a radar sequence identifier from the grant, when the received random access message comprises a dedicated random access preamble indicating a radar operation.

At least some embodiments enable radar capability for wireless devices in a multi-user scenario in a manner supporting interference mitigation.

In at least some embodiments, the meaning of grant is a downlink control information (DCI) included in a physical downlink control channel (PDCCH) and/or a physical downlink shared channel (PDSCH, especially via RRC signaling). The DCI may be configured to schedule radio resources for a downlink operation or an uplink operation.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
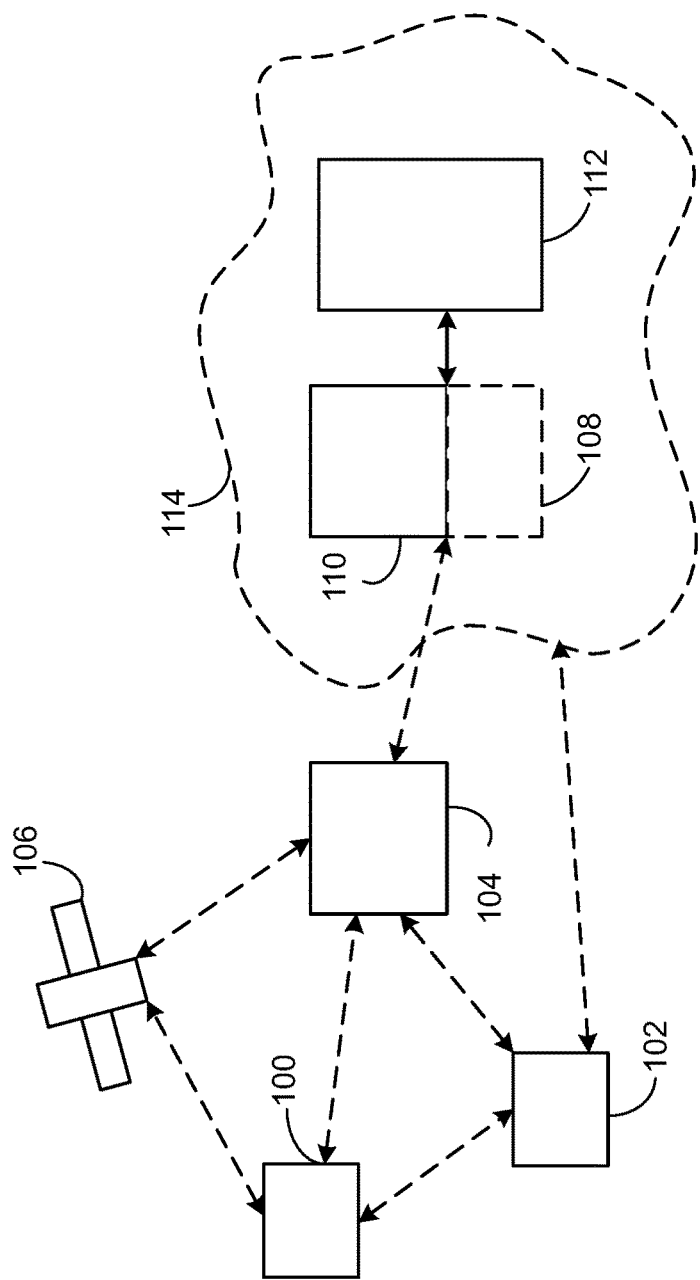
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In connection with radar operation of a wireless device in a wireless communication system, there is provided receiving a random access message, determining that the received random access message is for a radar operation of a wireless device in a wireless communication system, and transmitting a grant for one or more communication resources for the radar operation of the wireless device. In this way radar capability for wireless devices may be enabled in a multi-user scenario in a manner supporting interference mitigation. Radar operations of wireless devices provide that wireless communication system may obtain from the wireless devices radar information that is generated based on the radar operation of the wireless and use the radar information to generate a map of its surroundings, e.g. surroundings of a base station. This can be used for e.g. better assignment of Radio Frequency (RF) beam direction.

A radar operation of a wireless device in a wireless communication system may be performed on the same frequencies that are utilized by the wireless communication system for wireless communications, whereby interference due to uncoordinated radar operation may be a problem for the communications performed in the wireless communication system. Moreover, the frequencies for radar operation may be on unlicensed frequency bands, whereby the radar may cause interference also to other systems as well. On the other hand, a successful radar operation may be prevented by the wireless communication system or other systems operating on the same frequency with the radar operations.

Operating frequencies for the radar beyond 52.6 GHz and above 60 GHz are particularly interesting since containing relatively large spectrum allocations and large bandwidths, and being suitable for numerous applications of radar operations in wireless devices. Examples of applications comprise at least: performing a radar operation by a wireless device for detecting nearby soft-tissues for transmission power back-off; surveying the surrounding environment to optimize beam alignment procedures; enabling collision avoidance mechanisms in Virtual Reality and/or Augmented Reality and Vehicle to anything (V2X) use cases (including drones); detecting user interaction gestures.

A radar operation comprises a radar transmitting a sounding signal, i.e. a radar signal, using a radar sequence within a field of view of the radar. The radar may be a wireless device. The field of view of the radar may be defined by a direction transmitting the radar signal from the radar. The transmitted radar signal reaches an object located within the field of view of the radar after a time δ of a propagation delay has passed and the radar signal is reflected back from the object to the radar. The radar receives the reflected radar signal after 2δ from transmitting the radar signal. If no objects are located within the field of view, the transmitted signal is not reflected back. The time offset between the transmitted and the received reflected signal, the round-trip time, determines the distance to the reflected object. A distance to the object may be expressed by $$D = c\frac{T_R}{2}, \quad (1)$$

where D is the distance, c is speed of light and $T_R$ is the round-trip time from transmitting the radar signal to receiving the radar signal. The radar operation is capable of detecting objects in the field of view from a minimum distance, $d_{min}$, and up to a maximum distance, $d_{max}$, from the radar. Then, a propagation delay will follow $$\frac{d_{min}}{c} \le \delta \le \frac{d_{max}}{c}, \quad (2)$$

where c is speed of light and δ is the propagation delay for the radar signal to reach an object within the field of view. Accordingly, the field of view of the radar satisfies formula (2). A sampling frequency for radar operation on the communication resource may be defined by $$\frac{2d_{min}}{c} + T \le T_R \le \frac{2d_{max}}{c} + T, \quad (3)$$

where T is the duration of the radar signal, $T_R$ is the round-trip time, $d_{min}$ a minimum distance for detecting objects within the field of view and $d_{max}$ a maximum distance for detecting objects within the field of view. The communication resource may be at frequencies in the order of the several GHz. In an example, a sampling rate of a 4 GHz provides detecting objects at the minimum distance, $d_{min}$, of 3.75 cm. The ranging resolution can be further increased by using a higher sampling rate.

Examples of radar signals comprise radar signals that are contiguous in frequency and based on Zadoff Chu (ZC)-, m- or gold sequence. Because all of those sequence families already exist in NR UE, radar signals based on ZC-, m- or gold sequence may use an existing code generator of the New Radio (NR) UE. Moreover, the ZC-, m- or gold sequences have very low cross correlation properties, allowing the simultaneous presence of multiple radar signals in time. For example, in the case of ZC sequence, UE may select a root sequence randomly or root index can be linked to a signaled radar Reference Signal (RS) identifier (ID). Furthermore, cyclic shift may be utilized depending on the radar's range in order to maximize the number of sequences and to minimize a collision probability for the sequences. The minimization of the collision probability is an important target when UE requests a radar slot by using a dedicated random access preamble, since multiple UEs may receive a grant at the same time. In practice, the 2 GHz radar sequence consists of at least 2000 samples resulting in almost the same number of root sequences (nearest prime number). If cyclic shift "domain" is used in addition to root sequences, the total number of sequences may be up to around 100000, in turn resulting in very small collision probability.

An example of a radar signal is a Sounding Reference Signal (SRS) of a wireless communication system. SRSs may be used for Uplink (UL) sounding by wireless devices, for example by UE in 5G New Radio (NR). The SRSs provide that an access node access node (such as (e/g) NodeB) of the wireless communication system may estimate the UL channel quality based on the SRSs received from the wireless devices. The properties of the SRS among all NR UL RS have always comb signal in frequency (e.g utilized only every 2th, 4th, 8th . . . frequency pin), and results in respective repetition in time domain and therefore reduced accuracy of radar, making the SRS is suitable for short range radar operation. It has low cross correlation and high auto correlation properties, hence detecting signal copies will be simple and interference from other radar signals will be minimum. Furthermore, the generation of SRS signal is already supported by current UEs, whereby signaling an SRS ID to the UE is sufficient for using the SRS for radar signal. It should be appreciated that other signal with similar properties may be used for radar signal.

A communication resource for transmitting a radar signal may be a physical unit of a wireless medium controlled by a wireless communication system. The wireless communication system may apply a Channel Access (CA) method for controlling use of the wireless medium. The wireless medium may be divided into communication resources, e.g. resource blocks, in accordance with the CA applied by the wireless communication system such that the communication resources may be allocated to wireless devices. In this way the wireless medium of the wireless communication system may allow multiple wireless devices to access and connect to the wireless communication system. Accordingly, the wireless communication system may be referred to a multi-user communication system. In an example, the wireless medium may comprise one or more carrier frequencies for radio frequency communications and communication resources on the wireless medium may be defined by a combination of time and frequency units. In an example a communication resource for transmitting a radar signal (radar TX slot) may be a resource block or resource unit defined by a time slot and a sub-carrier frequency in accordance with an Orthogonal Frequency Division Multiple Access (OFDMA) CA method. On the other hand, a resource block may be defined on the wireless medium in accordance with another CA method such as Frequency Division Multiple Access (FDMA) and Time Division Multiple Access (TDMA).

A random access message refers to a message as part of an access procedure performed between a wireless device and a wireless communication system in a multi-user scenario. In the multi-user scenario, the wireless communication system is a multi-user communication system configured to allow multiple wireless devices to access and connect to the wireless communication system by the wireless devices performing a random access procedure with the wireless communication system. The random access procedure may be performed on a random access channel (RACH). The random access procedure facilitates controlling access to the wireless medium controlled by the wireless communication system. A successful random access procedure results in granting a wireless device one or more communication resources on a wireless medium controlled by the wireless communication system.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 1904) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 1906 in the mega-constellation may cover several satellite-enabled network entities that create on-ground cells. The on-ground cells may be created through an on-ground relay node 1904 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 3:
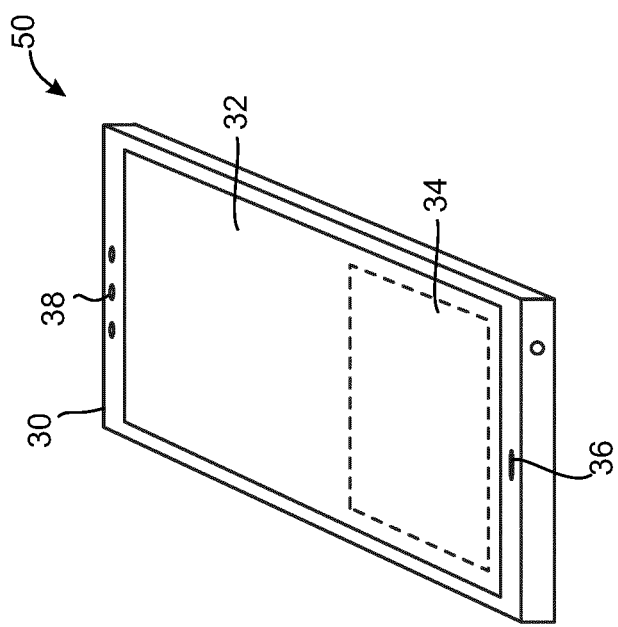
FIG. 3 shows an apparatus in accordance with at least some embodiments of the present invention.
Figure 2:
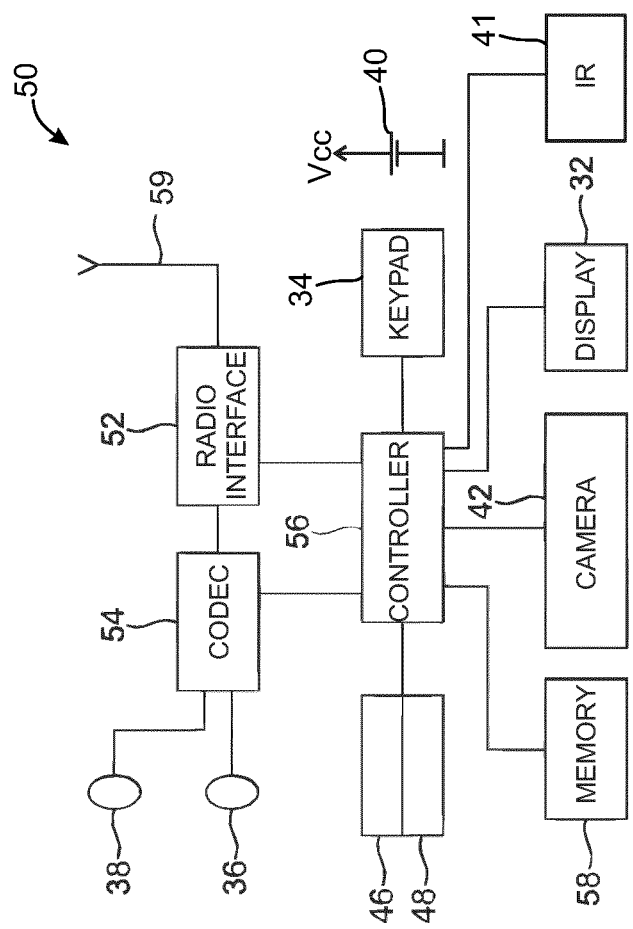
FIG. 2 shows a block diagram of an apparatus in accordance with at least some embodiments of the present invention.

The following describes in further detail suitable apparatus and possible mechanisms for implementing some embodiments. In this regard reference is first made to FIG. 2 which shows a schematic block diagram of an exemplary apparatus or electronic device 50 depicted in FIG. 3, which may incorporate a transmitter according to an embodiment of the invention.

The electronic device 50 may for example be a wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed.

For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 (also can be called as radio frequency module) connected to the controller (or the processor) and suitable for generating wireless communication signals for example for communication with a cellular communications network, a wireless communications system or a wireless local area network. The radio interface circuitry 52 includes one or more transmitters and one or more receivers. In this case, the transmitter and the receiver can be configured to one entity such as a radio transceiver. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 4:
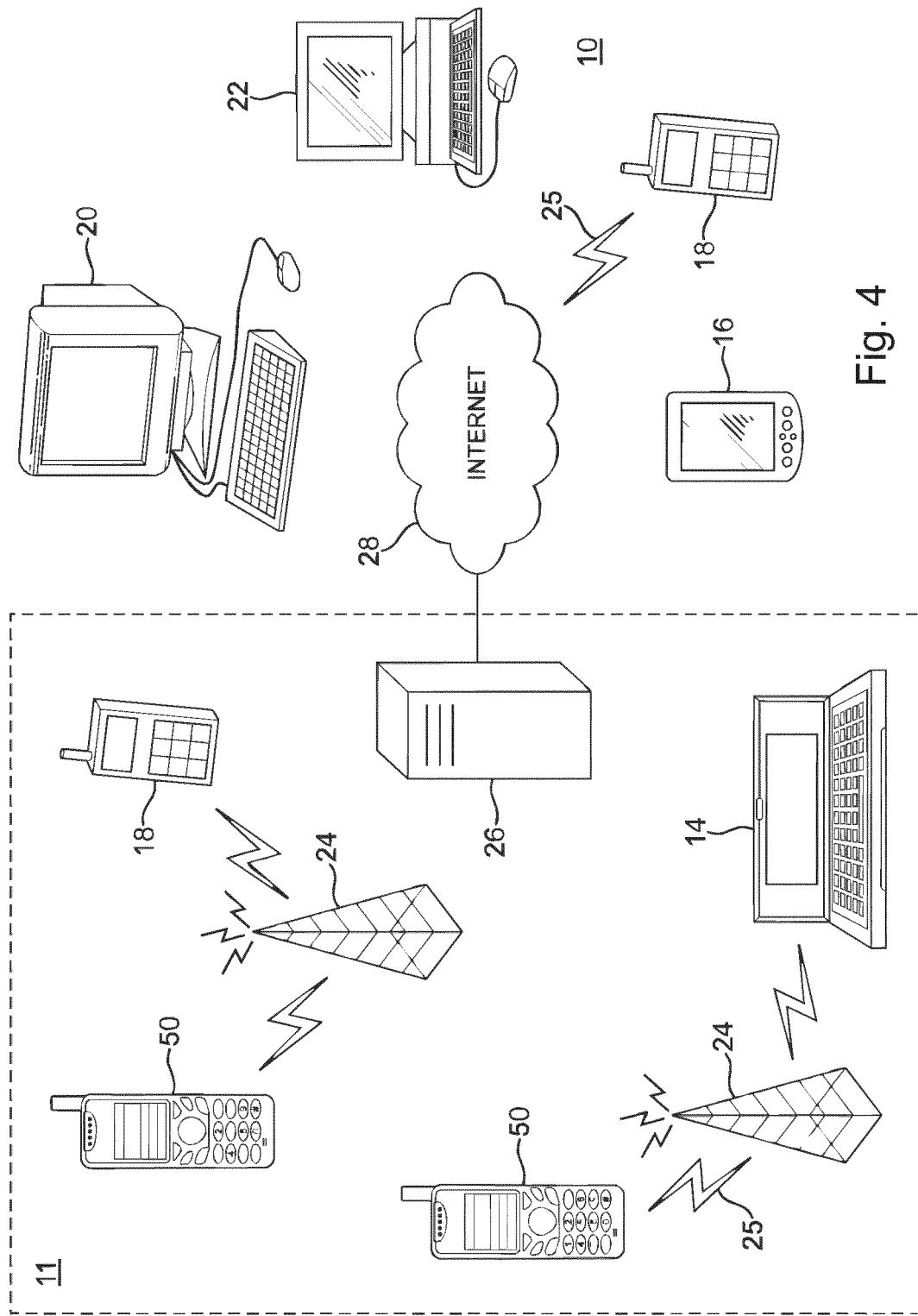
FIG. 4 shows an example of an arrangement for wireless communications comprising a plurality of apparatuses, networks and network elements.

With respect to FIG. 4, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 4 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Figures 5, 6:
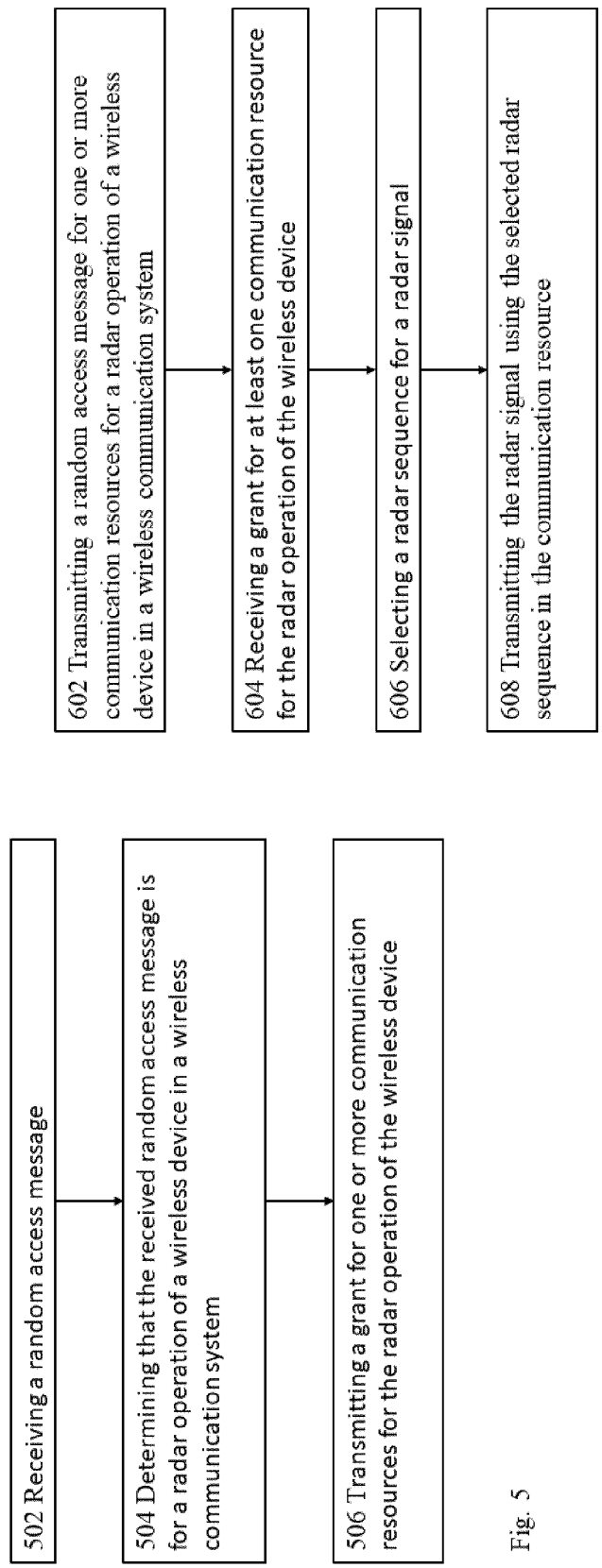
FIGS. 5, 6, 7 and 8 illustrate examples methods in accordance with at least some embodiments of the present invention.

FIGS. 5, 6, 7 and 8 illustrate examples methods in accordance with at least some embodiments of the present invention. Referring to FIG. 5, a method is provided for radar operation of a wireless device in a wireless communication system. The method may be performed at a network entity of the wireless communication system, for example an entity of the radio access network, such as at a gNB, communicating with a wireless device, e.g. UE.

Phase 502 comprises receiving a random access message.

Phase 504 comprises determining that the received random access message is for a radar operation of a wireless device in a wireless communication system.

Phase 506 comprises transmitting a grant for one or more communication resources for the radar operation of the wireless device. In an example, the grant may comprise information for identifying the communication resources of the radar operation such that radar operations may be performed by the wireless device on the identified communication resources. Since the communication resources are granted in response to determining the random access for the radar operation, interference caused by the radar operations may be considered before the grant such that radar related interference may be mitigated. The meaning of grant is a downlink control information (DCI) included in a physical downlink control channel (PDCCH) and/or a physical downlink shared channel (PDSCH, especially via RRC signaling). The DCI may be configured to schedule radio resources for a downlink operation or an uplink operation.

In an example, phase 502 comprises that the random access message is a random access message in accordance with a 2-step Random Access Channel (RACH) procedure or a 4-step RACH procedure. In an example, the 4-step RACH procedure may be according to the Release 15 specification defined by the 3$^{rd}$ Generation Partnership Project (3GPP) (refer to, Rel-15 TS 38.214 section 5,1). The 4-step RACH procedure comprises 4 steps between the wireless communication system and the wireless device accessing the communication system. The steps comprise the wireless device sending messages in the UL direction and the wireless communication system sending messages in the Downlink (DL) direction for example according to the following sequence of numbered messages: 1. UL preamble, 2. DL response, 3. UL message, 4. DL grant. In an example, the 2 step RACH procedure may comprise the wireless device sending messages in the UL direction and the wireless communication system sending messages in the DL direction for example according to the following sequence of numbered messages: 1. UL preamble & UL message, 2. DL grant. The 2-step RACH is currently being standardized in 3GPP Release 16 specifications.

In an example, phase 504 comprises determining that the random access message is a request from the wireless device for a radar TX slot (e.g., the communication resource).

In an embodiment, phase 506 comprises that the grant comprises a radar sequence identifier and information indicating the communication resources for the radar operation. In this way selection of the radar sequence may be controlled by the wireless communication system.

In an embodiment, phase 504 comprises that the random access message is determined to be for a radar operation, when the random access message comprises a dedicated random access preamble indicating the radar operation.

In an embodiment, phase 504 comprises that the random access message is determined to be for a radar operation of the wireless device on the basis of an uplink shared channel message associated with the random access message. In this way the wireless communication system may receive information using the uplink shared channel message regarding the random access message being related to a radar operation of the wireless device. In an example, the uplink shared channel message may comprise information indicating a radar operation of the wireless device. In an example the uplink shared channel may be a Physical Uplink Shared CHannel (PUSCH) of LTE or NR radio interface. A random access procedure performed by the wireless device may at least comprise the random access message received from the wireless device in phase 502. The uplink shared channel message may be received after the random access message is received from the wireless device in phase 502. Examples of the uplink shared channel messages comprise at least Radio Resource Control (RRC) protocol messages. In an example, phase 504 comprises that an RRC message comprising an information element indicating a radar operation of the wireless device is received from the wireless device after the random access message is received from the wireless device, whereby the random access message may be determined to be for a radar operation of the wireless device. The uplink shared channel may be a Physical Uplink Shared CHannel (PUSCH) on LTE or NR radio interface, for example.

In an embodiment, phase 506 comprises omitting a radar sequence identifier from the grant, when the receiving random access message comprises a dedicated random access preamble indicating a radar operation. The dedicated random access preamble may indicate that the radar sequence may be selected by the wireless device without assistance from the wireless communication system.

Referring to FIG. 6, a method is provided for radar operation of a wireless device in a wireless communication system. The method may be performed at a wireless device of a communication system, for example a UE, communicating with a network entity, e.g. gNB, of the wireless communication system.

Phase 602 comprises transmitting a random access message for one or more communication resources (e.g., the radar TX slot) for a radar operation of a wireless device in a wireless communication system.

Phase 604 comprises receiving a grant for at least one communication resource for the radar operation of the wireless device.

Phase 606 comprises selecting a radar sequence for generating a radar signal.

Phase 608 comprises transmitting the radar signal using the selected radar sequence in the communication resource. Since the radar operation is granted at least one communication resource in response to a random access message, the radar operation may be performed in a controlled manner to avoid interference due to the radar operation.

In an embodiment, phase 602 comprises that the random access message comprises a dedicated random access preamble indicating the radar operation. In this way the wireless communication system receiving the random access message may determine that the wireless device should be granted communications resources for radar operation. Moreover, the presence of the dedicated random access preamble may be used by the wireless communication system to determine whether a grant for one or more communication resources for the radar operation transmitted to the wireless device should include a radar sequence identifier. For example, if the random access message comprises the dedicated random access preamble, the radar sequence identifier may be omitted from the grant. In an example, the dedicated random access preamble may be used in the random access message, in response to a need for the wireless device and/or the wireless communication system to sweep their surrounding environment for physical obstacles.

In an embodiment, phase 602 comprises transmitting an uplink shared channel message associated with the random access message. In this way the wireless communication system may be provided information using the uplink shared channel message regarding the random access message being related to a radar operation of the wireless device. In an example the uplink shared channel may be a Physical Uplink Shared CHannel (PUSCH) of LTE or NR radio interface. In an example, the uplink shared channel message may comprise information indicating a radar operation of the wireless device. A random access procedure performed by the wireless device may at least comprise transmitting the random access message from the wireless device. The uplink shared channel message may be transmitted after the random access message has been transmitted. Examples of the uplink shared channel messages comprise at least Radio Resource Control (RRC) protocol messages. In an example, phase 602 comprises that an RRC message comprising an information element indicating a radar operation of the wireless device is transmitted from the wireless device after the random access message has been transmitted from the wireless device, whereby the random access message may be determined to be for a radar operation of the wireless device by the wireless communication system. The uplink shared channel may be a Physical Uplink Shared CHannel (PUSCH) on LTE or NR radio interface, for example.

In an embodiment, phase 606 comprises that the radar sequence is selected by the wireless device, when
the wireless device is out of coverage area of the wireless communication system;
the random access message has been transmitted without a dedicated random access preamble indicating a radar operation; and/or
the grant fails to include a radar sequence identifier. When the radar sequence is selected by the wireless device, the radar sequence may be selected without necessarily support from the wireless communication system.

In an embodiment, phase 606 comprises that the radar sequence is selected on the basis of a pre-configuration of a radar sequence identifier or a set of candidate radar sequence identifiers of the wireless device. In this way the radar signal may be generated on the basis of the radar sequence even without support from the wireless communication system, for example when the wireless device is out of coverage area of the wireless communication system.

In an embodiment, phase 606 comprises that the pre-configuration is based on a Subscriber Identity Module, SIM, or a User Equipment (UE) identifier of the wireless device. In this way the selection of the radar sequence identifier or the set of radar sequence identifiers may be preconfigured to the wireless device. In this way the radar signal may be generated on the basis of the radar sequence even without support from the wireless communication system, for example when the wireless device is out of coverage area of the wireless communication system.

In an example of phase 606, the pre-configuration provides a random selection of the radar sequence identifier.

In an embodiment, in phase 606 the selected radar sequence is based on ZC-, m- or gold sequence. An example of the radar sequence may be a sequence for generating an SRS of the wireless communication system. In this way the radar signal may be generated by the same generator than used for the SRS. In an example the code generator may generate the SRS on the basis of an SRS ID received by the wireless device in the grant. A cyclic shift may be applied to the radar sequence in order to maximize the number of sequences and to minimize a collision probability for the radar sequences.

In an embodiment, phase 608 comprises that the radar signal is transmitted on a pre-configured communication resource. In an example, the pre-configured communication resource may be defined by a time and frequency such as a time slot and a subcarrier frequency. Also a transmission power of the wireless device for the communication resource may be preconfigured. Pre-configuration of the communication resource provides that interference caused by radar operations may be controlled in a multi-used scenario even without support from the wireless communication system, for example when the wireless device is out of coverage area of the wireless communication system.

In an embodiment phase 606 comprises that the radar signal is based on Zhadoff Chu-, m- or gold sequence.

In an embodiment phase 606 comprises that the radar signal is a sounding reference signal of the wireless communication system.

Figure 7:
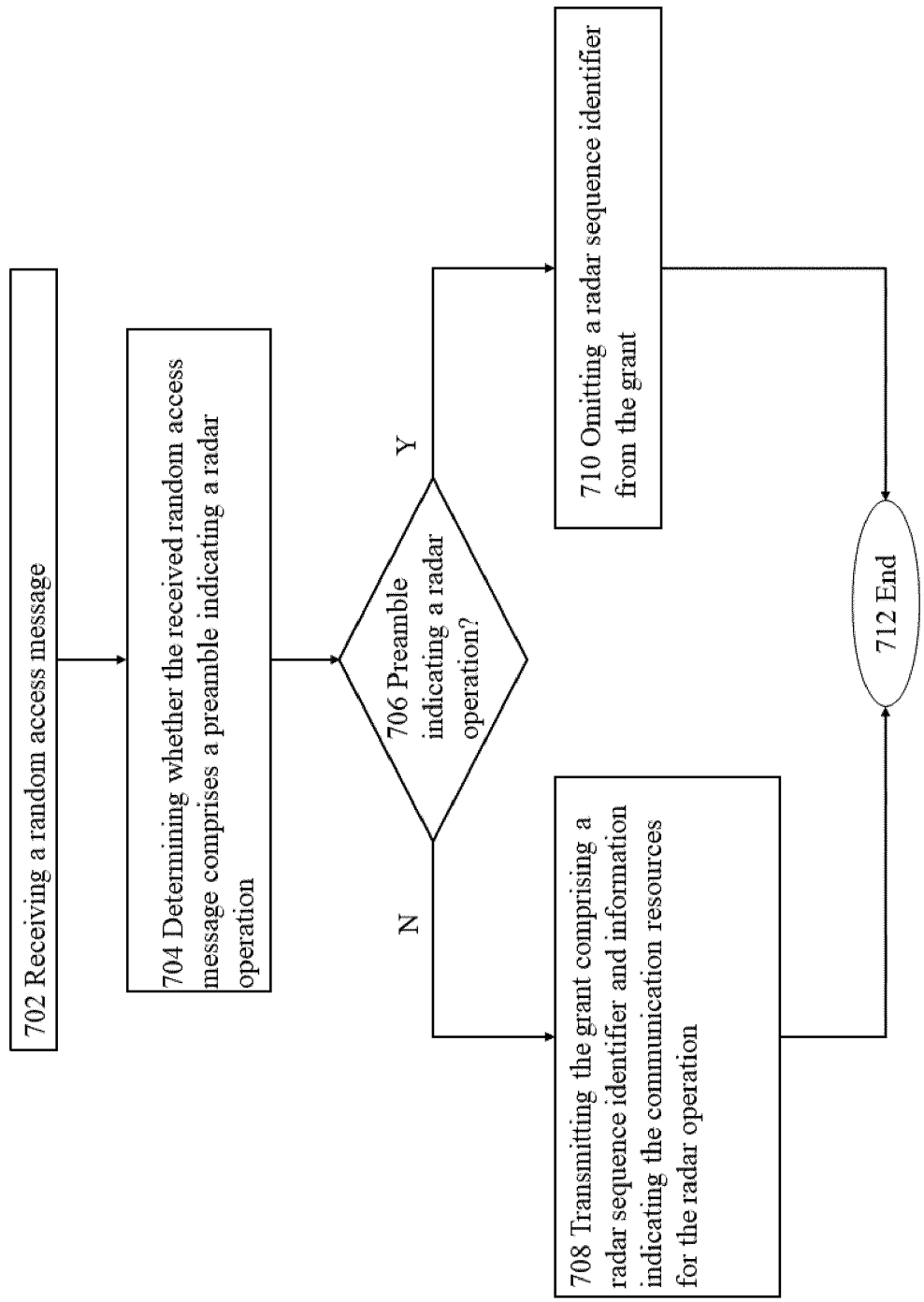

Referring to FIG. 7, a method is provided for controlling selection of radar sequence for radar operation of a wireless device in a wireless communication system. The method may be performed at a network entity of the wireless communication system, for example an entity of the radio access network, such as at a gNB.

Phase 702 may be performed in accordance with phase 502.

Phase 704 comprises determining whether the received random access message comprises a preamble indicating a radar operation.

Phase 706 comprises continuing the method to phase 708, if the received random access message does not comprise a preamble indicating a radar operation, and continuing the method to phase 710, if the received random access message comprises a preamble indicating a radar operation.

Phase 708 comprises transmitting a grant comprising a radar sequence identifier and information indicating the communication resources for the radar operation. Since the grant comprises the radar sequence identifier, the wireless device may be caused to select the radar sequence indicated by the radar sequence identifier for controlling interference caused by the radar operation.

Phase 710 comprises omitting a radar sequence identifier from a grant, when the received random access message comprises a preamble indicating a radar operation. In this way the radar sequence may be selected at the wireless device more freely. When the radar operation is indicated by the preamble of the random access message, the wireless device may be determined to be configured to select the radar sequence in a manner that supports interference mitigation between wireless devices performing radar operations in the wireless communication system.

The method ends in phase 712 after the transmission of the grant with or without the radar sequence identifier has been caused.

Figure 8:
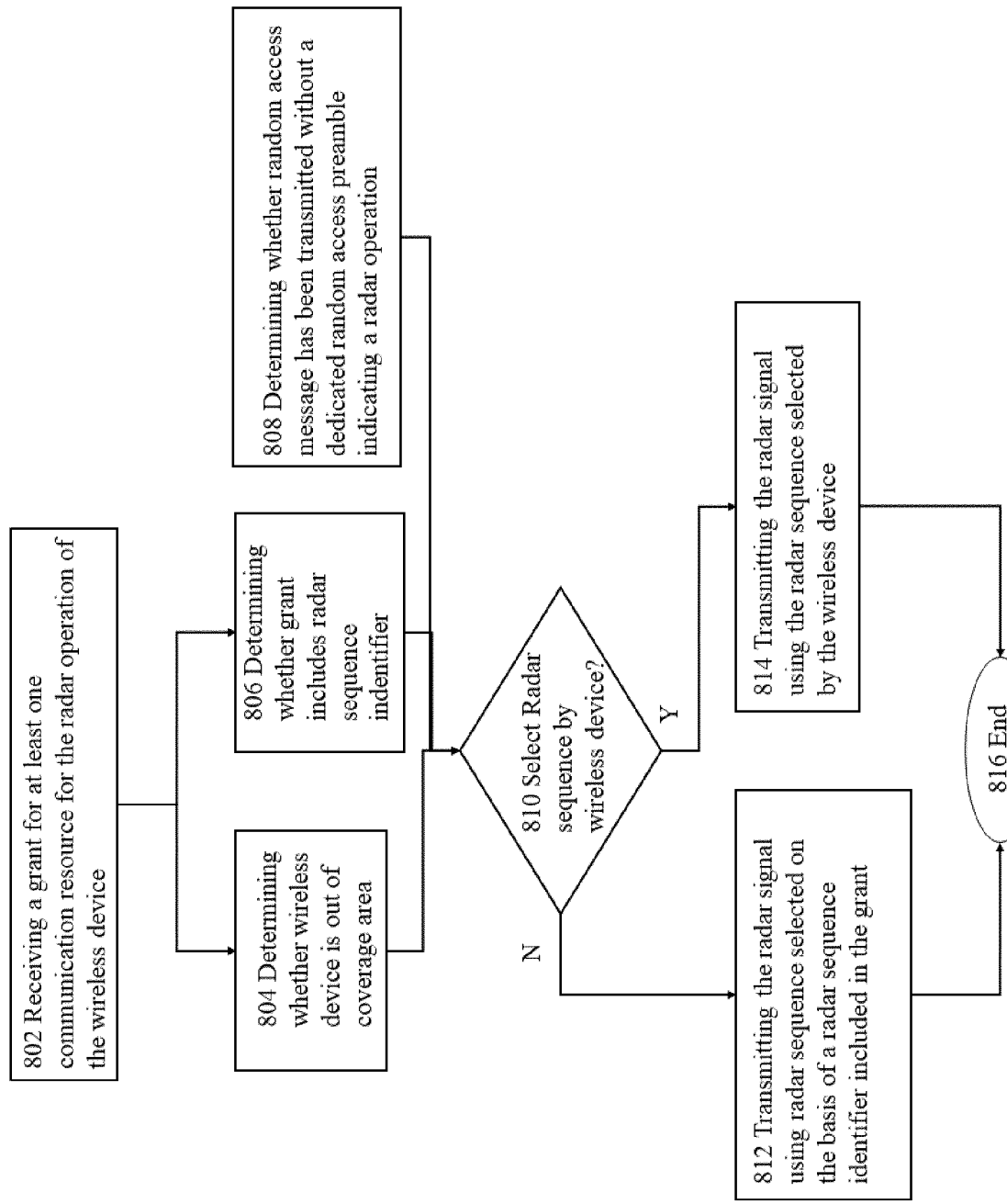

Referring to FIG. 8, a method is provided for controlling selection of radar sequence for radar operation of a wireless device in a wireless communication system. The method may be performed at a wireless device of a communication system, for example a UE.

Phase 802 comprises receiving a grant for at least one communication resource for the radar operation of the wireless device. In an example, phase 802 may be performed in accordance with phases 602 and 604 of FIG. 6.

Phase 804 comprises determining whether the wireless device is out of coverage area of the wireless communication system.

Phase 806 comprises determining whether the grant comprises a radar sequence identifier.

Phase 808 comprises determining whether a random access message comprising a dedicated random access preamble indicating a radar operation has been transmitted. The random access message comprising the dedicated random access preamble may have been transmitted for radar operation of the wireless device for example in phase 602.

Phase 810 comprises continuing the method to phase 814 when the radar sequence is selected by the wireless device, and if the selection of the radar sequence is not performed by the wireless device or the selection of the radar sequence is assisted by the wireless communication system the method continues to phase 812. In an embodiment, phase 810 comprises selecting the radar signal by the wireless device when the wireless device is out of coverage area of the wireless communication system;

the random access message has been transmitted without a dedicated random access preamble indicating a radar operation; and/or the grant fails to include a radar sequence identifier.

In an embodiment, phase 810 comprises selecting the radar sequence on the basis of a radar sequence identifier included in the grant. In this way the radar sequence is selected by the the wireless communication system or at least assisted by the wireless communication system.

In an example of phase 810, the radar signal may be selected by the wireless device, when it is determined in phase 804 that the wireless device is out of coverage area of the wireless communication system.

In an example of phase 810, the radar signal may be selected by the wireless device, when it is determined in phase 806 that the grant fails to include a radar sequence identifier.

In an example of phase 810, the radar signal may be selected by the wireless device, when it is determined in phase 808 that the random access message has been transmitted without a dedicated random access preamble indicating a radar operation.

In an example of phase 810, the radar sequence is selected by the wireless communication system or at least assisted by the wireless communication system, when it is determined in phase 806 that a radar sequence identifier is included in the grant.

Phase 812 comprises transmitting the radar signal using radar sequence selected on the basis of a radar sequence identifier included in the grant.

Phase 814 comprises transmitting the radar signal using the radar sequence selected by the wireless device.

In phase 816, the method ends after the selection of the radar sequence has been controlled.

Figure 9B:
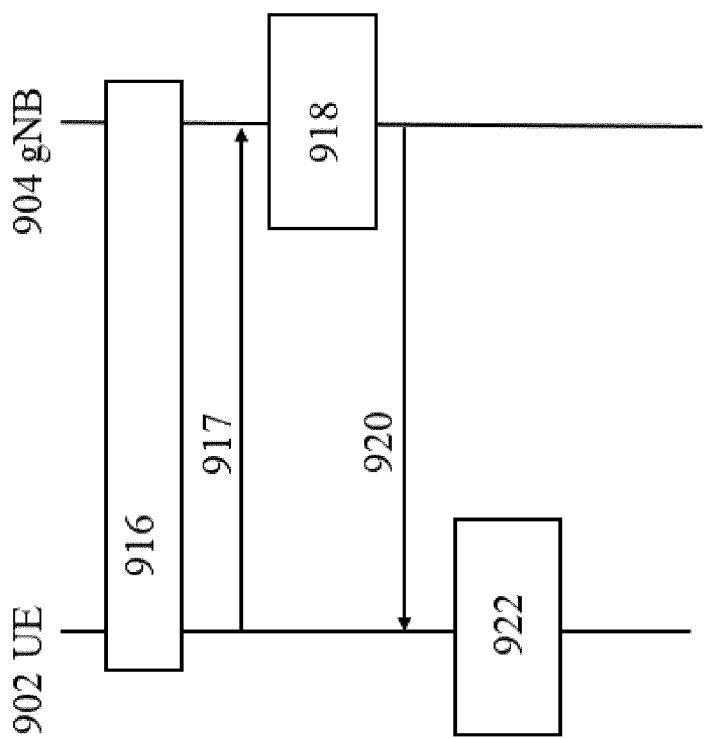
FIGS. 9a and 9b illustrate sequences in accordance with at least some embodiments of the present invention.
Figure 9A:
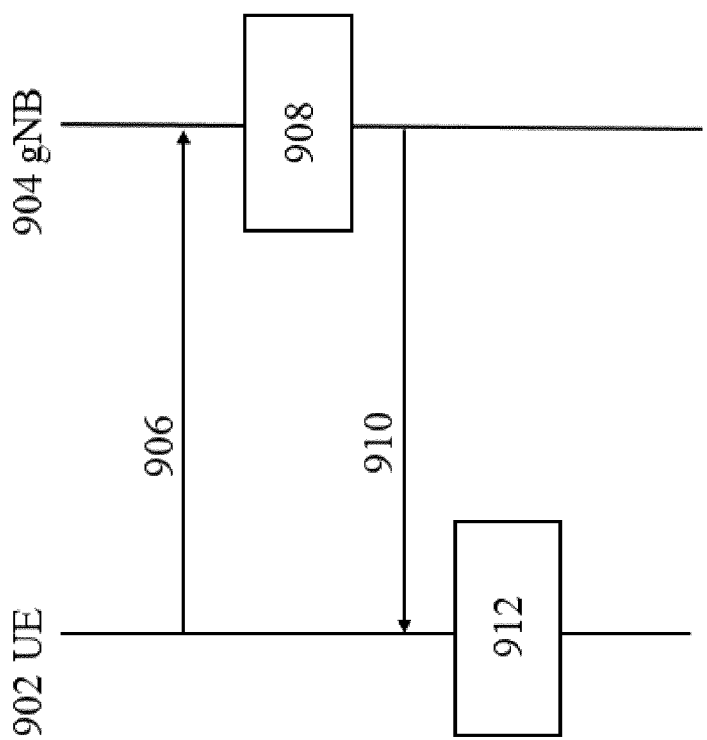

FIGS. 9*a* and 9*b* illustrate sequences in accordance with at least some embodiments of the present invention. The sequence illustrates communications and operation between a user equipment (UE) 902 and a gNB 904 of a wireless communication system. FIG. 9*a* illustrates a sequence, where the gNB 904 is provided information indicating the radar operation in a random access procedure. The radar operation of the UE provides that the gNB (network) may obtain from the UE radar information that is generated based on the radar operation of the UE and use the radar information to generate a map of its surroundings. This can be used for e.g. better assignment of Radio Frequency (RF) beam direction.

Phase 906 comprises the UE transmitting a random access message to the gNB. In The random access message may comprise a dedicated random access preamble, whereby the gNB may determine that the wireless device should be granted communications resources for radar operation. The random access message may be a part of a random access procedure performed between the UE and the gNB. The random access procedure may be a 2-step random access procedure or a 4-step random access procedure.

Phase 908 comprises the gNB determining that the random access message is for a radar operation of the UE. The radar operation may be determined on the basis of the random access message comprising a dedicated random access preamble indicating a radar operation of the UE.

Phase 910 comprises the gNB transmitting the UE a grant for one or more communication resources for the radar operation of the UE. The grant may comprise information for identifying the communication resources of the radar operation such that radar operations may be performed by the UE on the communication resources. At least in some embodiments, the grant may include a radar sequence identifier such that the UE may be caused to select the radar sequence corresponding to the radar sequence identifier for transmitting a radar signal. However, it should be appreciated that at least in some embodiments, the radar sequence identifier may be omitted from the grant, when the random access message comprises a preamble indicating a radar operation.

Phase 912 comprises the UE selecting a radar sequence and performing one or more radar operations. The radar operations may at least comprise the UE transmitting a radar signal and using the selected radar sequence using the granted communication resources. If an object is within a field of view of the radar signal, phase 912 comprises the UE receiving a reflection of the transmitted radar signal. It should be appreciated that reflections may not be received by the UE if objects are out of range of the radar signal or the reflections arrive at the UE at time instant that is outside of a time slot defined by the granted communication resources.

FIG. 9*b* illustrates a sequence, where the gNB is provided information indicating the radar operation as part of a message on an uplink shared channel associated with a random access procedure performed by the UE. The radar operation of the UE provides that the gNB (network) may obtain from the UE radar information that is generated based on the radar operation of the UE and use the radar information to generate a map of its surroundings. This can be used for e.g. better assignment of RF beam direction.

Phase 916 comprises performing a random access procedure between the UE and the gNB. The random access procedure may comprise at least a random access message from the UE to the gNB. Examples of the random access procedure comprise a 2-step random access procedure or a 4-step random access procedure.

Phase 917 comprises the UE transmitting a message on an uplink shared channel. The message may be associated with the random access procedure. The message may comprise information for indicating gNB that the random access procedure is for radar operation of the UE. In an example, the message is an RRC message on a PUSCH.

Phase 918 comprises the gNB determining that the random access message is for a radar operation of the wireless device on the basis of the uplink shared channel message from the wireless device. The radar operation may be determined on the basis of the message received on the uplink shared channel in phase 917, for example in accordance to described with phase 504 in FIG. 5.

Phase 920 comprises the gNB transmitting the UE a grant for one or more communication resources for the radar operation of the UE. The grant may comprise information for identifying the communication resources of the radar operation such that radar operations may be performed by the UE on the communication resources. At least in some embodiments, the grant may include a radar sequence identifier such that the UE may be caused to select the radar sequence corresponding to the radar sequence identifier for transmitting a radar signal.

Phase 922 comprises the UE selecting a radar sequence and performing one or more radar operations. The radar sequence may be selected on the basis of the radar sequence identifier included in the grant.

Figure 10:
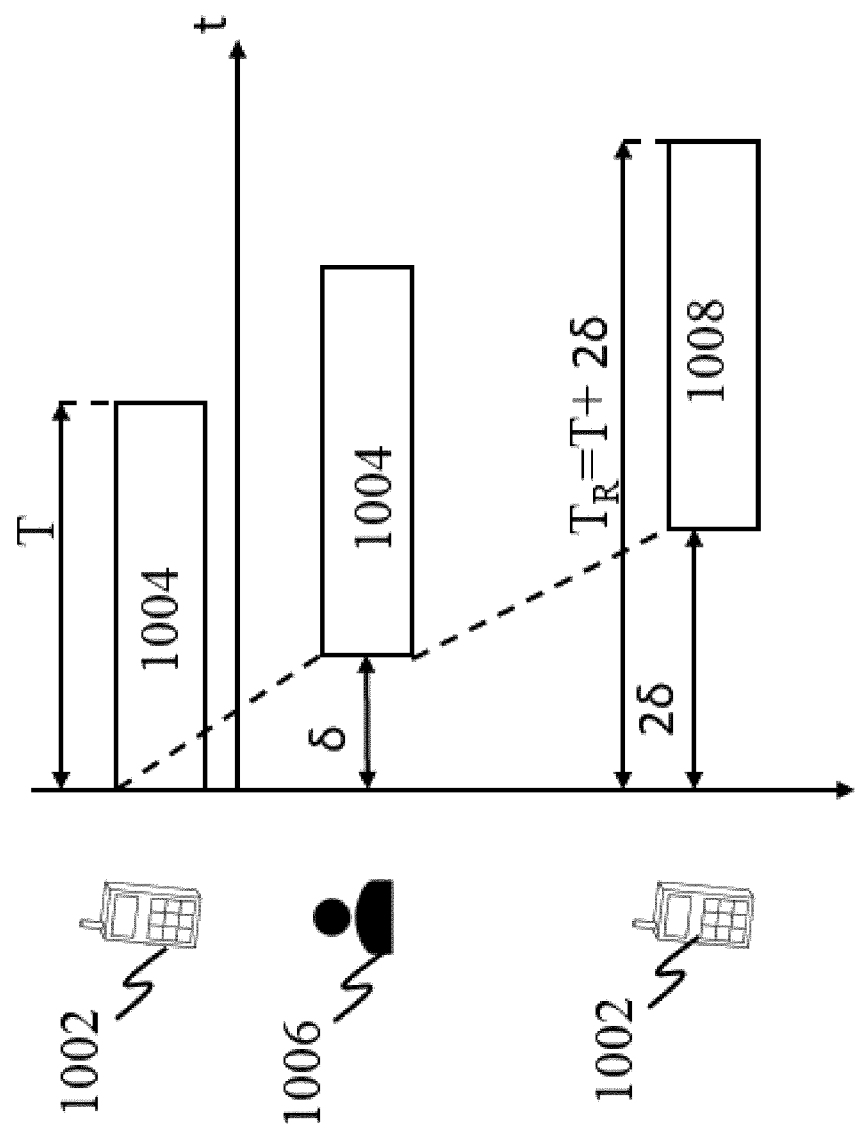
FIG. 10 illustrates an example of radar operation of a wireless device in accordance with at least some embodiments of the present invention.

FIG. 10 illustrates an example of radar operation of a wireless device in accordance with at least some embodiments of the present invention. The radar operation may be performed by a wireless device 1002, for example UE in phase 912 of FIG. 9a.

The wireless device 1002 transmits a radar signal 1004 generated on the basis of a selected radar sequence and on granted communication resources.

The radar signal arrives at an object 1006, for example a human, located within a field of view of the wireless device after time δ from transmitting the radar signal by the wireless device. Then the radar signal is reflected from the object and the reflection 1008 of the radar signal arrives at the wireless device after time 2δ from transmitting the radar signal by the wireless device.

Figure 11:
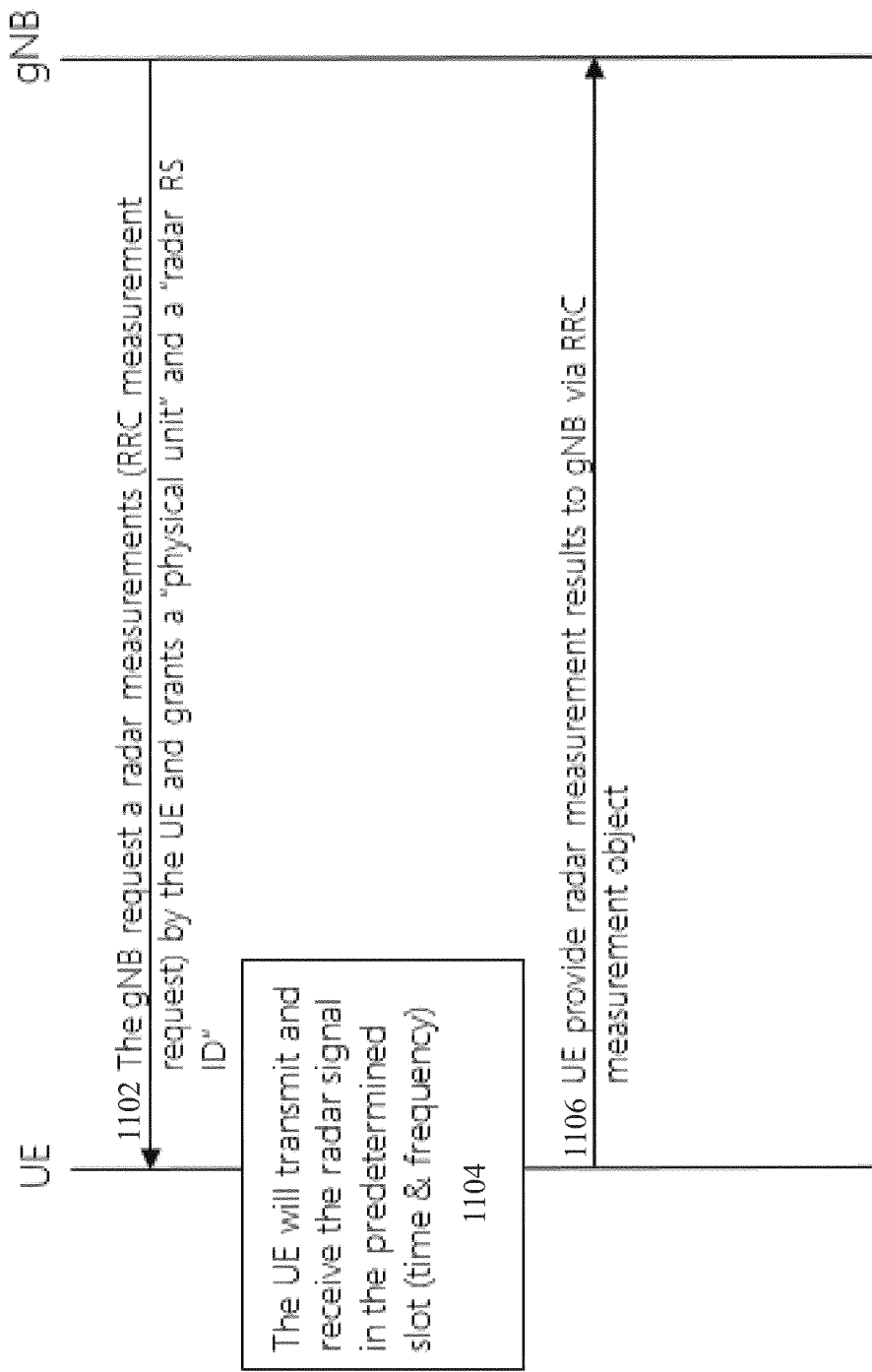
FIG. 11 illustrates network triggered radar operation and reporting radar measurements from UE to network in a sequence in accordance with at least some embodiments of the present invention.

According to at least some embodiments there is provided network triggered radar operation. According to at least some embodiments there is provided reporting of radar measurements from UE to a network. FIG. 11 illustrates network triggered radar operation and reporting radar measurements from UE to network in a sequence in accordance with at least some embodiments of the present invention. The sequence illustrates communications and operation between the user equipment (UE) and a gNB of a wireless communication system, when the gNB triggers a radar operation by the UE. The radar operation comprises the UE performing a radar measurement by sensing a radar signal. Additionally, the reporting of radar measurements is illustrated.

Phase 1102 comprises the gNB triggering the UE to perform a radar measurement. The triggering may comprise the gNB paging the UE in an RRC idle mode with a dedicated information on UE radar measurement request and/or on a slot (time/frequency) of the radar measurement.

In an example, phase 1102 may comprise the gNB transmitting the UE an RRC measurement request comprising a radar sequence identifier and information indicating the communication resources, e.g. one or more physical units, for the radar operation.

Phase 1104 comprises the UE performing the radar measurement. The radar measurement may comprise the UE transmitting and receiving a radar signal in the predetermined slot (time & frequency). The radar measurements may be performed in accordance with described in phase 922.

Once the UE has performed the radar measurement, phase 1106 may be performed comprising the UE reporting the radar measurement to the gNB. This measurement report can be done by:

Extending RRC measurement report (RRC idle/connected)

Radar measurement via dedicated PRACH procedure (similar as the radar time/frequency request) with dedicated measurement field for the network.

In an example, phase 1106 may comprise the UE providing/transmitting results of the radar measurement to the gNB via one or more RRC measurement objects.

Figure 12:
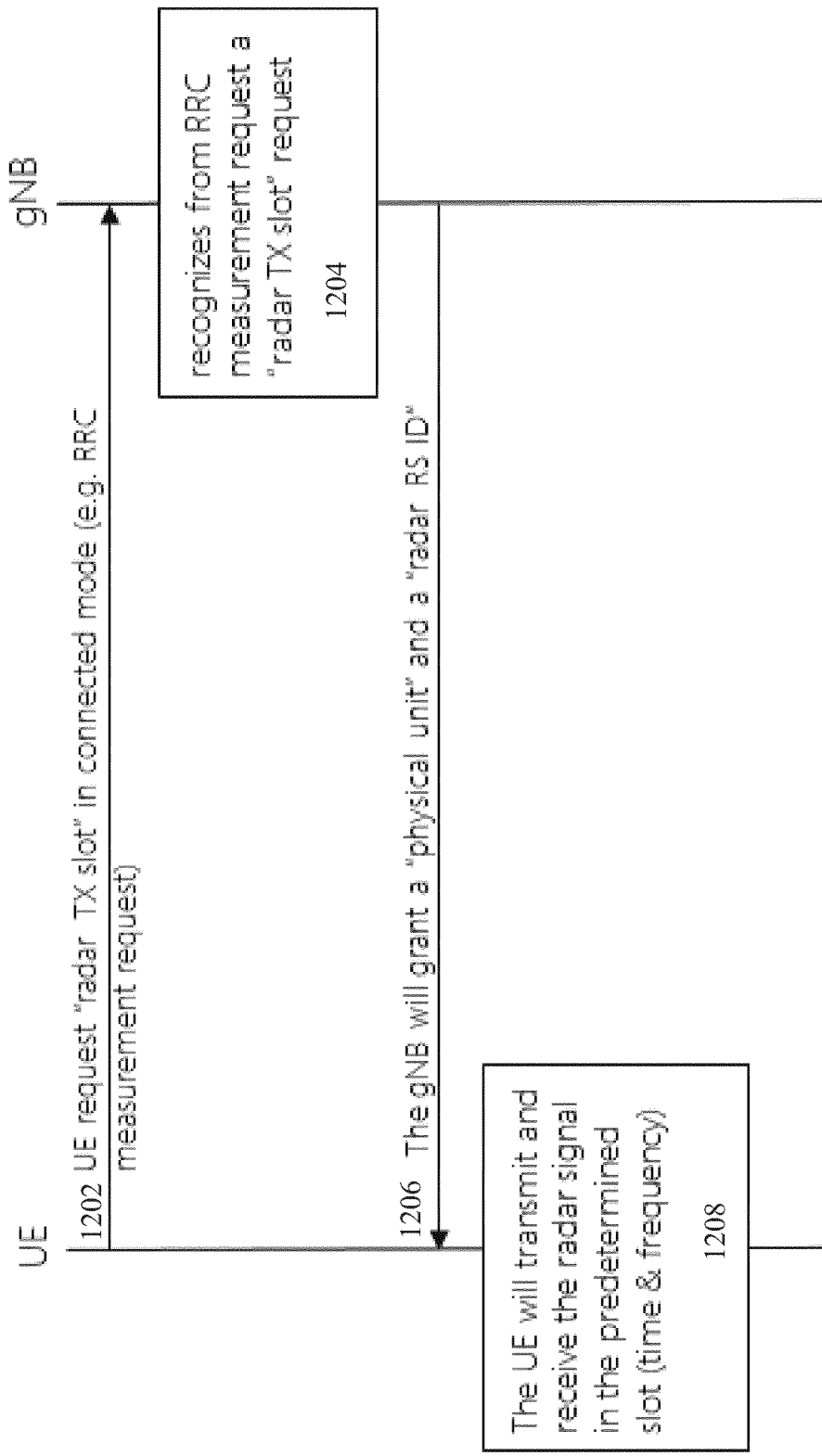
FIG. 12 illustrates an example of a sequence for UE to request radar operation during RRC connected mode in accordance with at least some embodiments of the present invention.

FIG. 12 illustrates an example of a sequence for UE to request radar operation during RRC connected mode in accordance with at least some embodiments of the present invention. The sequence illustrates communications and operation between a user equipment (UE) and a gNB of a wireless communication system.

Phase 1202 comprises the UE transmitting an RRC measurement request to a gNB. The RRC measurement request may be for a dedicated radar measurement slot (time/frequency), e.g. radar TX slot, using RRC connected mode signaling. In this way, the UE may request one or more RRC measurement objects during an RRC connected mode.

Phase 1204 comprises the gNB determining that the RRC measurement request to be a request for a radar operation, e.g. a request for a dedicated radar measurement slot.

Phase 1206 may be performed by the gNB in accordance with described in phase 920 in FIG. 9b.

Phase 1208 comprises the UE performing the radar measurement. The radar measurement may comprise the UE transmitting and receiving a radar signal in the predetermined slot (time & frequency). The radar measurements may be performed in accordance with described in phase 922 in FIG. 9b.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

It should be appreciated that in the above description the term obtaining, for example obtaining information, data, a grant, a message or a random access message a random access message, may in some examples comprise acquiring for example by receiving information, data, a grant, a message or a random access message.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An access node comprising:
a processor; and
a transceiver;
wherein the transceiver is configured to:
receive a random access message from a wireless device of a wireless communication system, wherein the random access message indicates one or more radar communication resource request; and
wherein the processor is configured to:
determine that the received random access message is for a radar operation of the wireless device; and
wherein the processor is configured to:
transmit a grant for one or more communication resources for the radar operation of the wireless device;
wherein the grant comprises a radar sequence identifier and information indicating the communication resources for the radar operation.

2. The access node according to claim 1, wherein the random access message is determined to be for a radar operation of the wireless device, when the random access message comprises a dedicated random access preamble indicating the radar operation.

3. The access node according to any of claim 1, wherein the processor is further configured to omit a radar sequence identifier from the grant, when the received random access message comprises a dedicated random access preamble indicating a radar operation.

4. The access node according to claim 1, wherein the random access message is determined to be for a radar operation of the wireless device, on the basis of an uplink shared channel message from the wireless device associated with the random access message.

5. A wireless device comprising:
a processor; and
a transceiver,
wherein the processor is configured to:
control the transceiver to transmit a random access message for a radar operation of the wireless device in a wireless communication system, wherein the random access message indicates one or more radar communication resource request; and
wherein the transceiver is configured to:
receive a grant for at least one communication resource for the radar operation of the wireless device; and
wherein the processor is further configured to:
select a radar sequence for generating a radar signal; and
wherein the transceiver is further configured to:
transmit the radar signal using the selected radar sequence in the communication resource;
wherein the processor is configured to control the transceiver to transmit an uplink shared channel message associated with the random access message.

6. The wireless device according to claim 5, wherein the radar sequence is selected by the wireless device, when
the wireless device is out of coverage area of the wireless communication system;
the random access message has been transmitted without a dedicated random access preamble indicating a radar operation; and/or
the grant fails to include a radar sequence identifier.

7. The wireless device according to claim 5, wherein the random access message comprises a dedicated random access preamble indicating the radar operation.

8. The wireless device according to claim 5, wherein the radar sequence is selected on the basis of a pre-configuration of a radar sequence identifier or a set of candidate radar sequence identifiers of the wireless device.

9. The wireless device according to claim 8, wherein the pre-configuration is based on a Subscriber Identity Module, SIM, or a User Equipment (UE) identifier of the wireless device.

10. The wireless device according to any of claim 5, wherein the radar sequence is selected on the basis of a radar sequence identifier included in the grant.

11. A method comprising:
receiving a random access message from a wireless device of a wireless communication system, wherein the random access message indicates one or more radar communication resource request;
determining that the received random access message is for a radar operation of the wireless device; and
transmitting a grant for one or more communication resources for the radar operation of the wireless device;
wherein the grant comprises a radar sequence identifier and information indicating the communication resources for the radar operation.

12. A method comprising:
transmitting a random access message for a radar operation of a wireless device in a wireless communication system, wherein the random access message indicates one or more radar communication resource;
receiving a grant for at least one communication resource for the radar operation of the wireless device;
selecting a radar sequence for generating a radar signal;
transmitting the radar signal using the selected radar sequence in the communication resource; and
transmitting an uplink shared channel message associated with the random access message.

13. The method according to claim 12, wherein the radar sequence is selected by the wireless device, when
the wireless device is out of coverage area of the wireless communication system;
the random access message has been transmitted without a dedicated random access preamble indicating a radar operation; and/or
the grant fails to include a radar sequence identifier.

14. The method according to claim 12, wherein the random access message comprises a dedicated random access preamble indicating the radar operation.

15. The method according to claim 12, wherein the radar sequence is selected on the basis of a pre-configuration of a radar sequence identifier or a set of candidate radar sequence identifiers of the wireless device.

16. The method according to claim 15, wherein the pre-configuration is based on a Subscriber Identity Module, SIM, or a User Equipment, UE, identifier of the wireless device.

* * * * *